United States Patent
Yeager

(10) Patent No.: US 6,918,010 B1
(45) Date of Patent: Jul. 12, 2005

(54) METHOD AND SYSTEM FOR PREFETCHING DATA

(75) Inventor: Kenneth C. Yeager, Sunnyvale, CA (US)

(73) Assignee: Silicon Graphics, Inc., Mountain View, CA (US)

(*) Notice: Subject to any disclaimer, the term of this patent is extended or adjusted under 35 U.S.C. 154(b) by 280 days.

(21) Appl. No.: 10/272,642

(22) Filed: Oct. 16, 2002

(51) Int. Cl.[7] .............................................. G06F 12/06
(52) U.S. Cl. ...................................... 711/137; 711/170
(58) Field of Search ................................ 711/137, 170, 711/154, 204; 712/244

(56) References Cited

U.S. PATENT DOCUMENTS

| | | | | |
|---|---|---|---|---|
| 5,983,324 A | * | 11/1999 | Ukai et al. ................... | 711/137 |
| 6,122,729 A | * | 9/2000 | Tran .......................... | 712/244 |
| 6,324,616 B2 | * | 11/2001 | Chrysos et al. ............. | 710/244 |
| 2002/0194434 A1 | * | 12/2002 | Kurasugi .................... | 711/137 |
| 2003/0065888 A1 | * | 4/2003 | Nishiyama .................. | 711/137 |
| 2004/0133747 A1 | * | 7/2004 | Coldewey ................... | 711/137 |

* cited by examiner

Primary Examiner—Pierr-Michel Bataille
(74) Attorney, Agent, or Firm—Baker Botts L.L.P.

(57) ABSTRACT

In prefetching cache lines from a main memory to a cache memory, an array of memory locations to be prefetched is determined and a base address indicating a highest address in the array is identified as well as a loop index used to point to the first address in the array. A prefetch index, which is the loop index plus a latency/transfer value, is used to prefetch memory locations as the array is processed. After a memory location is prefetched and initialized, the loop index and the prefetch index are incremented. The prefetch index is compared to a threshold value. If the prefetch index is less than the threshold value, then the next memory location in the array is prefetched and the prefetch index is again incremented and compared to the threshold value. If the prefetch index is equal to or greater than the threshold value, then the prefetch instruction is converted to a no operation instruction to prevent memory locations outside of the array from being prefetched during the processing of the array.

20 Claims, 1 Drawing Sheet

METHOD AND SYSTEM FOR PREFETCHING DATA

TECHNICAL FIELD OF THE INVENTION

The present invention relates in general to memory transfer operations and more particularly to a method and system for prefetching data.

BACKGROUND OF THE INVENTION

In a cache coherent memory system, a processor must read a copy of a cache line into its cache before it can store results anywhere in that cache line. Frequently, however, the processor will write new data into all locations of the cache line and obliterate all of the data read from memory. In such a situation, there was no advantage to having this data initially transferred from the memory. To avoid this, processors typically implement read without data operations which take the form of prefetch instructions that do not require a transfer of data. However, a prefetch instruction explicitly alters the data as the processor will fill in the cache line with zeroes. As a result, an associated compiler must be careful not to issue prefetch instructions outside of a destination array. This could complicate code generation since each prefetch instruction must be issued several loop iterations before the instructions that actually store data into the cache line. A typical simple loop would prefetch beyond an end of an array. This would not be acceptable for general use of a prefetch and zero type of instruction that modifies the cache line it prefetches since modification is being performed outside of the array.

SUMMARY OF THE INVENTION

From the foregoing, it may be appreciated by those skilled in the art that a need has arisen for a cache line prefetch technique that does not modify contents beyond an end of an array as a result of the prefetch instruction. In accordance with the present invention, a method and system for prefetching data are provided that substantially eliminate or greatly reduce disadvantages and problems associated with conventional data prefetching techniques.

According to an embodiment of the present invention there is provided a method for prefetching data that includes identifying an array of memory locations in a main memory and memory locations in the array to be prefetched to a cache memory. A highest address of the array is identified and a prefetch index pointer to an address of a memory location in the array to be prefetched is set based on the highest address of the array. A determination is made as to whether the prefetch index pointer is less than a threshold value. The memory location at the address is prefetched by a prefetch instruction in response to the prefetched index pointer being less than the threshold value. Once the index pointer reaches or exceeds the threshold value, the prefetch instruction is converted to a no operation instruction to prevent memory locations outside of the array from being prefetched.

The present invention provides various technical advantages over conventional prefetching techniques. For example, one technical advantage is to avoid modifying a cache line outside of a desired array. Another technical advantage is to perform desired prefetching with a minimal number of instruction lines. Yet another technical advantage is to use one of two registers involved in the prefetch instruction to identify when a desired prefetch has completed. Other technical advantages may be readily ascertainable by those skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which.

DETAILED DESCRIPTION OF THE INVENTION

Figure 1:
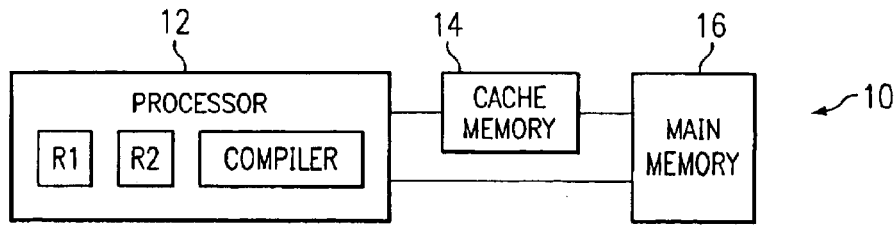
FIG. 1 illustrates a simplified block diagram of a memory system.

FIG. 1 shows a simplified block diagram of a memory system 10. Memory system 10 includes a processor 12, a cache memory 14, and a main memory 16. In operation, processor 12 may request access to data. Preferably, the data is located in cache memory 14 for fast and efficient access. Memory requests for data not in cache memory 14 must go to main memory 16 which introduces delay into the operation of memory system 10. The data is typically requested from main memory 16 for placement into cache memory 14 in order for processor 12 to access the data. In order to reduce delay due to main memory 16 access, a request for data from main memory will also trigger a prefetch of data. The requested data and the prefetched data are placed into cache memory 14. The prefetched data is placed in cache memory 14 in anticipation of being requested by processor 12. Such prefetching of data is used to increase the operation speed of memory system 10.

Figure 2:
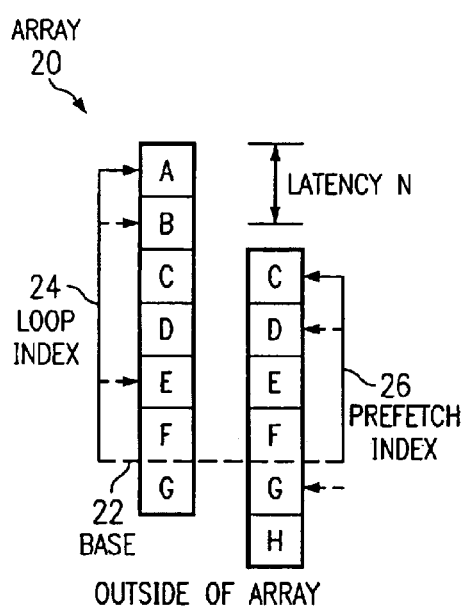
FIG. 2 illustrates a portion of locations to be prefetched within the memory system.

FIG. 2 shows a portion of memory to be operated on during program execution. Whenever processor 12 requests specific information, the memory location in main memory 16 containing the specific information is accessed and provided to cache memory 14. Main memory 16 will also provide other prefetched information from other memory locations related to the specific information through prefetch instructions. Prefetch instructions are preferably executed early enough so that the memory location being prefetched is received just before the program loop is ready to use it. Depending upon the latency and transfer time involved, prefetching may be five to ten lines of data ahead of the program loop address being processed. Thus, the prefetch address leads the loop address by 'n' lines as determined by the latency and the transfer time within memory system 10.

The memory locations associated with the specific information and the prefetched information are part of an array 20 of memory locations provided from main memory 16 to cache memory 14. Array 20 is defined by a base address 22 and a loop index 24. Base address 22 identifies the end of array 20. Loop index 24 is used by the program loop to traverse through array 20. The value associated with base address 22 is placed in one register R1 and the value of loop index 24 is placed in another register R2. Array 20 is accessed by summing the two registers and then subsequently adjusting the value of loop index 24. Loop index 24 is used to point to a location in array 20 and preferably begins with a negative value so that the sum of the registers results in a first address that identifies the first complete cache line in array 20. Base address 22 and loop index 24 are preferably adjusted so that their final value is zero when the end of array 20 is reached since zero is a convenient value with which to compare. However, if processor 12 has more flexible branch instructions that check for a specific threshold, the use of zero is not necessary. Processor 12 may go through array 20 in either a positive or negative direction. Loop index 24 initially selects a line of one end of array 20 and increments through until the other end of array 20 is reached.

A compiler in process 12 performs a program loop where loop index 24 is incremented for each iteration and thus becomes less negative in value. The program loop continues until each line within array 20 has been processed. Each iteration of the program loop will also perform a prefetch operation. The prefetch operation requests a cache line 'n' lines ahead of the current loop address. Thus, a prefetch index 26, which is loop index 24 plus 'n', is used for the prefetch operation. In the example shown, when line 'a' of array 20 is being processed, line 'c' of array 20 is being prefetched. When it is time to process line 'c', line 'c' will be present and immediately available for processing. The prefetch instruction being performed is preferably a prefetch empty instruction where the processor will zero the line if it obtains ownership of it and will make no changes to the line if it already owns it as opposed to a prefetch and zero instruction where the processor will zero the line whether or not it had ownership of the line.

At some point during the program loop, an attempt to prefetch a line outside of array 20 will be made. For the example shown, when line 'e' of array 20 is reached for processing, prefetching of line 'g' outside of array 20 would be the next prefetch instruction to occur. If line 'g' was to be prefetched, its contents may be zeroed unnecessarily as it was not intended to be accessed since it is outside of array 20. However, a check is made to see if prefetch index 26 has reached a threshold value. For this discussion, as long as prefetch index 26 is negative, a line of array 20 will be prefetched. Once prefetch index 26 is no longer negative, with zero being a non-negative number, the prefetch instruction which is part of the program loop will be converted by the hardware into a no operation instruction. In this manner, lines outside of array 20 will not be prefetched and their contents will not be overwritten. Thus, when the prefetch instruction for line 'g' is executed, this prefetch instruction is converted into a no operation instruction to avoid prefetching line 'g'. All subsequent prefetch instructions will also be converted into no operation instructions through the remainder of the program loop.

The problem of modifying a location outside of array 20 is solved by having processor 12 check the value of prefetch index 26 after generation of a prefetch address. When the prefetch instruction in the program loop is reached, the prefetch instruction is sent for execution by the program software. However, before executing the prefetch instruction, the hardware will compare prefetch index 26 to the threshold value. If prefetch index 26 reaches or exceeds the threshold value, the hardware treats the prefetch instruction as a no operation instruction and thus no lines outside of array 20 are prefetched. Alternatively, instead of using prefetch index 26, the loop index 24 may be compared to the threshold value as long as the latency/transfer value "n" is accounted for.

Figure 3:
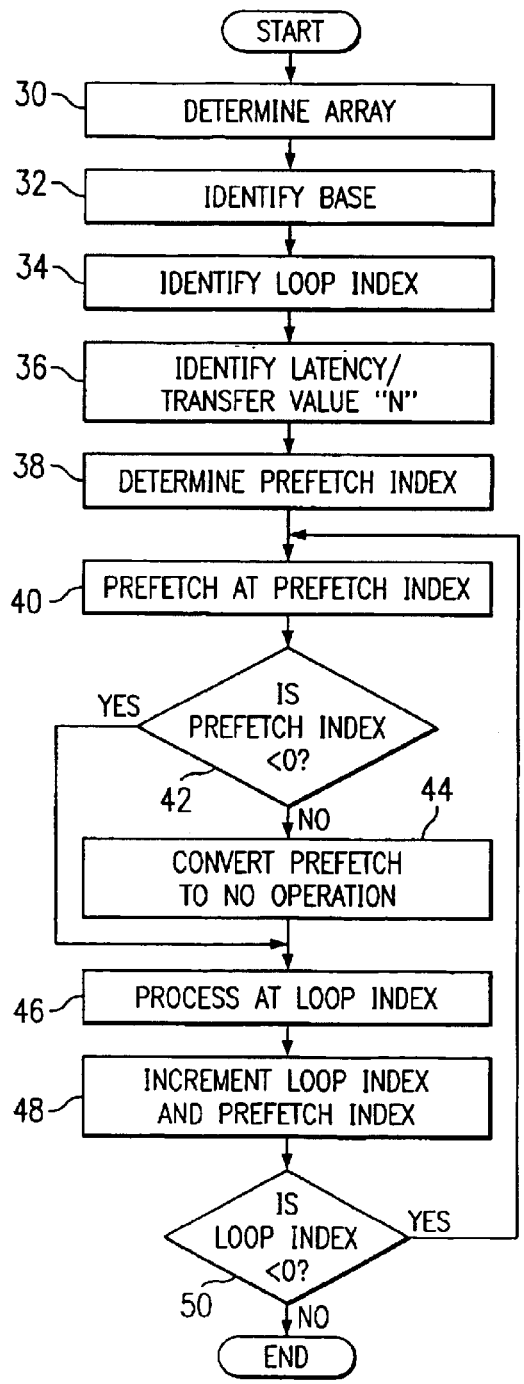
FIG. 3 illustrates a prefetch operation flow.

FIG. 3 shows an example of a program loop. At block 30, array 20 is determined followed by the determinations of base address 22 at block 32, loop index at block 34, latency/transfer value 'n' at block 36, and prefetch index 26 at block 38. Base address 22 is used to establish the threshold value. At block 40, the prefetch instruction is executed to prefetch the line identified by base address 22 plus prefetch index 26. At block 42, a determination is made as to whether prefetch index 26 has reached or exceed the threshold value. If so, then the prefetch instruction is converted to a no operation instruction at block 44. At block 46, processing is performed at the line identified by base address 22 and loop index 24. Loop index 24 and prefetch index 26 are then incremented at block 48. Incrementing of loop index 24 and prefetch index 26 may be based on a size of the lines in array 20. A typical cache line size may be 64 or 128 bytes. The program loop branches at block 50 to block 40 if loop index 24 has not reached or exceeded the threshold value.

By converting the prefetch instruction to a no operation instruction when the end of array 20 has been reached, unnecessary complexity to the program loop is avoided. A branch to skip the prefetch instruction is not needed which would have increased the operating time of the program loop and reducing its efficiency. Existing code for the program loop can be used with only minor modifications and no degradation in performance.

Thus, it is apparent that there has been provided, in accordance with the present invention, a method and system for prefetching data that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims. Moreover, it is not intended that the present invention be limited in any way by any statements made above that are not otherwise reflected in the appended claims.

What is claimed is:

1. A method for prefetching data, comprising:
   identifying an array of memory locations in a main memory, each memory location in the array being associated with an address;
   identifying a highest address of the array;
   setting a prefetch index pointer to a prefetch address of a memory location in the array to be prefetched based on the highest address of the array;
   performing a prefetch instruction to prefetch the memory location in the array to be prefetched in response to the prefetch index pointer being less than a threshold value;
   converting the prefetch instruction to a no operation instruction in response to the prefetch index pointer reaching and exceeding the threshold value.

2. The method of claim 1, further comprising:
   incrementing the prefetch index pointer.

3. The method of claim 2, wherein the prefetch index pointer is incremented according to a size of the memory location.

4. The method of claim 3, wherein the size of the memory location is a cache line of 128 bytes.

5. The method of claim 2, further comprising:
   performing a prefetch instruction to prefetch a next memory location according to the incremented prefetch index pointer in response to the incremented prefetch index pointer being less than the threshold value;
   converting the prefetch instruction into a no operation instruction in response to the incremented prefetch index pointer reaching and exceeding the threshold value.

6. The method of claim 1, wherein the highest address of the array indicates an end of the array.

7. The method of claim 6, further comprising:

preventing prefetching of memory locations beyond the end of the array.

8. The method of claim 1, further comprising:

initializing the memory location upon being prefetched.

9. The method of claim 1, wherein the threshold value is zero.

10. The method of claim 1, further comprising:

establishing the threshold value according to the highest address of the array.

11. A computer readable medium having code for prefetching data, the code operable to:

identify an array of memory locations in a main memory to be prefetched to a cache memory, each memory location in the array being associated with an address;

identify a highest address of the array;

set an index pointer to a prefetch address of a memory location in the array to be prefetched based on the highest address of the array;.

perform a prefetch operation to prefetch the memory location in the array to be prefetched at the prefetch address in response to the index pointer being less than a threshold value;

convert the prefetch operation to a no operation in response to the index pointer reaching or exceeding the threshold value.

12. The computer readable medium of claim 11, wherein the code is further operable to:

increment the index pointer;

perform a prefetch operation to prefetch a next memory location according to the incremented index pointer in response to the incremented index pointer being less than a threshold value;

convert the prefetch operation to a no operation in response to the incremented index pointer reaching or exceeding the threshold value.

13. The computer readable medium of claim 11, wherein the code is further operable to:

initialize the memory location upon completion of the prefetch operation.

14. The computer readable medium of claim 11, wherein the code is further operable to:

prevent prefetching of a memory location outside of the array.

15. The computer readable medium of claim 11, wherein the threshold value is zero.

16. A system for prefetching data, comprising:

a main memory operable to store data in a plurality of memory locations;

a cache memory operable to stored contents of desired ones of the plurality of memory locations;

a processor operable to access data from the main memory, the processor operable to have data placed into the cache memory, the processor operable to prefetch data for placement into the cache memory in anticipation of a future use, the processor operable to identify an array of memory locations associated with data to be prefetched, each of the memory locations in the array being associated with an address, the processor operable to set an index pointer to a prefetch address of a memory location in the array to be prefetched based on a highest address of the array, the processor operable to determine whether the index pointer is less than a threshold value, the processor operable to perform a prefetch operation to prefetch the memory location in the array to be prefetched at the prefetch address in response to the index pointer being less than the threshold value, the processor operable to convert the prefetch operation into a no operation in response to the index pointer reaching or exceeding the threshold value.

17. The system of claim 16, wherein the processor is operable to increment the index pointer, the processor operable to perform the prefetch operation to prefetch a next memory location according to the incremented index pointer in response to the index pointer being less than the threshold value, the processor operable to convert the prefetch operation into a no operation in response to the index pointer reaching or exceeding the threshold value.

18. The system of claim 16, wherein the processor is operable to prevent prefetching a memory location outside of the array.

19. The system of claim 16, wherein the processor is operable to initialize the prefetched memory location in the cache memory.

20. The system of claim 19, wherein the processor initializes the prefetched memory location by clearing the contents of the prefetched memory location.

* * * * *